US011473501B2

(12) United States Patent
Gomez et al.

(10) Patent No.: US 11,473,501 B2
(45) Date of Patent: Oct. 18, 2022

(54) ANTI-ICING FOR GAS TURBINE SYSTEM

(71) Applicant: General Electric Company, Schenectady, NY (US)

(72) Inventors: Francisco Gomez, Queretaro (MX); Laxmikant Merchant, Bangalore (IN)

(73) Assignee: GENERAL ELECTRIC COMPANY, Schenectady, NY (US)

( * ) Notice: Subject to any disclaimer, the term of this patent is extended or adjusted under 35 U.S.C. 154(b) by 0 days.

(21) Appl. No.: 17/131,301

(22) Filed: Dec. 22, 2020

(65) Prior Publication Data

US 2022/0195922 A1    Jun. 23, 2022

(51) Int. Cl.
*F02C 7/047* (2006.01)
*F02C 6/08* (2006.01)
*B64D 33/02* (2006.01)

(52) U.S. Cl.
CPC .............. *F02C 7/047* (2013.01); *F02C 6/08* (2013.01); *B64D 2033/0233* (2013.01); *F05D 2220/323* (2013.01); *F05D 2260/20* (2013.01)

(58) Field of Classification Search
CPC .... F02C 7/04; F02C 7/047; F02C 7/08; F02C 6/08; B64D 2033/0233; F05D 2220/323; F05D 2260/20
See application file for complete search history.

(56) References Cited

U.S. PATENT DOCUMENTS

| | | | |
|---|---|---|---|
| 5,166,479 A | 11/1992 | Gras et al. | |
| 5,560,195 A | 10/1996 | Anderson et al. | |
| 8,272,222 B2 | 9/2012 | Zhang et al. | |
| 9,771,865 B2 | 9/2017 | Merchant et al. | |
| 9,890,713 B2 | 2/2018 | Zhang et al. | |
| 10,022,660 B2 | 7/2018 | Santini et al. | |
| 10,663,170 B2 | 5/2020 | Abu-Irshaid et al. | |
| 2004/0256174 A1 | 12/2004 | Friou | |
| 2010/0232945 A1* | 9/2010 | Zhang | F01D 25/10 415/177 |
| 2011/0162383 A1* | 7/2011 | Zhang | F02K 1/36 415/119 |
| 2015/0068217 A1 | 3/2015 | Merchant et al. | |
| 2017/0234220 A1 | 8/2017 | Saraswathi et al. | |
| 2017/0234239 A1* | 8/2017 | Saraswathi | F02C 7/047 415/1 |
| 2018/0272167 A1 | 9/2018 | Ahmadzadegan et al. | |

(Continued)

FOREIGN PATENT DOCUMENTS

| | | |
|---|---|---|
| DE | 1009552 A1 | 9/1991 |
| EP | 1461513 B1 | 8/2006 |

OTHER PUBLICATIONS

U.S. Appl. No. 17/131,280, filed Dec. 22, 2020, Francisco Gomez.

(Continued)

*Primary Examiner* — Steven M Sutherland
(74) *Attorney, Agent, or Firm* — Fletcher Yoder, P.C.

(57) ABSTRACT

An anti-icing system for a gas turbine system includes multiple nozzle assemblies. Each nozzle assembly of the multiple nozzle assemblies includes a nozzle having one or more outlets that are configured to inject a heated fluid in a radially outward direction and a cap having an annular wall that circumferentially surrounds at least a portion of the nozzle. The cap is configured to direct the heated fluid to flow in an upstream direction into an airflow to facilitate mixing of the heated fluid with the airflow.

23 Claims, 10 Drawing Sheets

(56) References Cited

U.S. PATENT DOCUMENTS

2018/0274445 A1 9/2018 Sankarakumar et al.
2019/0003387 A1 1/2019 Ponyavin et al.

OTHER PUBLICATIONS

U.S. Appl. No. 16/745,312, filed Jan. 16, 2020, Rajesh Prabhakaran Saraswathi.
European Search Report for EP Application No. 21214629.4, dated May 12, 2022, 7 pgs.
European Search Report for EP Application No. 21214625.2, dated May 11, 2022, 6 pgs.

* cited by examiner

ANTI-ICING FOR GAS TURBINE SYSTEM

BACKGROUND

The subject matter disclosed herein relates to an anti-icing system for a gas turbine system.

In general, a gas turbine system combusts a mixture of compressed air and fuel to produce hot combustion gases. More particularly, the gas turbine system includes a compressor that compresses air to generate the compressed air. The gas turbine system also includes a combustor that mixes the compressed air and the fuel to produce combustion gases. The combustion gases are directed into a turbine to drive rotation of turbine blades and a shaft that is coupled to the turbine blades. The rotation of the shaft may drive a load, such as an electrical generator that is coupled to the shaft.

BRIEF DESCRIPTION

Certain embodiments commensurate in scope with the originally claimed subject matter are summarized below. These embodiments are not intended to limit the scope of the claimed subject matter, but rather these embodiments are intended only to provide a brief summary of possible forms of the claimed subject matter. Indeed, the claimed subject matter may encompass a variety of forms that may be similar to or different from the embodiments set forth below.

In one embodiment, an anti-icing system for a gas turbine system includes anti-icing system for a gas turbine system includes multiple nozzle assemblies. Each nozzle assembly of the multiple nozzle assemblies includes a nozzle having one or more outlets that are configured to inject a heated fluid in a radially outward direction and a cap having an annular wall that circumferentially surrounds at least a portion of the nozzle. The cap is configured to direct the heated fluid to flow in an upstream direction into an airflow to facilitate mixing of the heated fluid with the airflow.

In one embodiment, a gas turbine system includes a turbine, a combustor, and a compressor coupled to an air intake system. The air intake system is configured to supply a heated airflow to the compressor, and the air intake system includes a filter system and an anti-icing system. The anti-icing system includes multiple nozzle assemblies, and each nozzle assembly of the multiple nozzle assemblies includes a nozzle with one or more outlets and a cap having an annular wall that circumferentially surrounds the one or more outlets. The nozzle is configured to inject a heated fluid through the one or more outlets and the annular wall of the cap is configured to direct the heated fluid to flow in an upstream direction into an airflow to facilitate mixing of the heated fluid with the airflow to form the heated airflow upstream of the filter system.

In one embodiment, a method includes receiving an airflow that flows in a first direction into an air intake conduit of an air intake system of a gas turbine system. The method also includes injecting a heated fluid through one or more outlets of a nozzle positioned within the air intake conduit. The method further includes guiding the heated fluid through an annular channel defined between the nozzle and a cap that is positioned to circumferentially surround at least a portion of the nozzle. The method further includes outputting the heated fluid in a second direction into the airflow within the air intake conduit to facilitate mixing between the heated fluid and the airflow to form a heated airflow within the air intake conduit.

BRIEF DESCRIPTION OF THE DRAWINGS

These and other features, aspects, and advantages of the present anti-icing system and method will become better understood when the following detailed description is read with reference to the accompanying drawings in which like characters represent like parts throughout the drawings, wherein.

DETAILED DESCRIPTION

One or more specific embodiments of the present disclosure will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming but would nevertheless be a routine undertaking of design, fabrication, and manufacture for those of ordinary skill having the benefit of this disclosure.

When introducing elements of various embodiments of the present disclosure, the articles "a," "an," "the," and "said" are intended to mean that there are one or more of the elements. The terms "comprising," "including," and "having" are intended to be inclusive and mean that there may be additional elements other than the listed elements.

A gas turbine system receives an airflow (e.g., ambient airflow) through an air intake system, which directs the airflow to a compressor of the gas turbine system. The disclosed embodiments relate to an anti-icing system that is configured to block a buildup of ice on a filter within the air intake system. The anti-icing system includes nozzles that are configured to spray a heated fluid (e.g., compressor discharge air) to mix with the airflow in order to form a heated airflow that increases a temperature adjacent to the filter within the air intake system and that blocks the buildup of ice on the filter within the air intake system. Each of the nozzles is coupled to a cap that is configured to direct the heated fluid to flow in an upstream direction (e.g., into the airflow) to thereby increase the mixing of the airflow and the heated fluid within the air intake system. In this way, even in inclement conditions (e.g., cold and/or high relative humidity ambient conditions), the temperature of the heated airflow that flows through the filter within the air intake system may be maintained within desirable limits across a face of the filter (e.g., across all or most of the face of the filter) to enable proper operation of the air intake system and to provide satisfactory performance of the gas turbine system.

While the anti-icing system is generally described as being used to mix the airflow and the heated fluid to increase the temperature of the airflow (e.g., to turn the airflow into the heated airflow for anti-icing functionality) during cold ambient conditions to facilitate discussion, it should be appreciated that the anti-icing system may be more generally referred to as an inlet bleed heat (IBH) system and may also advantageously mix the airflow and the heated fluid in a manner that blocks extremely high temperatures (e.g., hot spots that exceed a high temperature limit for the filter) at the filter of the air intake system during other conditions (e.g., hot ambient conditions and/or IBH maximum flow conditions). Thus, the anti-icing system may also protect the filter from the extremely high temperatures that may otherwise result in early degradation of material of the filter and/or damage (e.g., burn) the material of the filter.

As an example, with hot ambient conditions and or IBH maximum flow conditions, the anti-icing system may mix the airflow and the heated fluid such that at least 50 percent (or at least 55, 60, 70, 80, 90, or 95 percent) of the face of the filter is heated by the heated airflow having a respective temperature that is at least 2 degrees Celsius (or at least 3, 4, or 5 degrees Celsius) greater than an ambient temperature (e.g., the temperature of the airflow upon entry into the air intake system; during cold ambient conditions). Additionally, the anti-icing system may also mix the airflow and the heated fluid such that less than 50 percent (or less than 40, 30, 20, 10, or 5 percent) of the face of the filter is heated to the extremely high temperatures (e.g., hot spots of more than 90 degrees Celsius extend across less than 50 percent of the filter face of the filter or are completely eliminated, even when the heated fluid that mixes with the airflow has a respective temperature that is greater than 400 degrees Celsius; during hot ambient conditions and/or IBH maximum flow conditions). As a more specific example, for the heated fluid with a temperature of about 425 degrees Celsius, the anti-icing system may mix the airflow and the heated fluid such that a maximum temperature of the heated airflow reaches about 82 degrees Celsius over a distance of 0.8 meters. However, typical anti-icing systems without the nozzles with the caps may require a distance of 3.8 meters or more in which to mix the airflow and the heated fluid such that a maximum temperature of the heated airflow reaches the target temperature of about 82 degrees Celsius. Thus, the use of nozzles with caps reduces material and assembly costs for the air intake system.

Furthermore, the anti-icing system generally provides better mixing, which provides a positive impact on the compressor by reducing thermal distortion of the heated airflow at an inlet of the compressor. It should be appreciated that the anti-icing system disclosed herein may be used in additional operating conditions, such as at non-icing temperatures and gas turbine base load with the anti-icing system inactivated (e.g., turned off). In such cases, the structural components of the anti-icing system (e.g., flow deflectors) may generate pressure loss that is not increased significantly due to the presence of the structural components (e.g., as compared to systems without the structural components).

Figure 1:
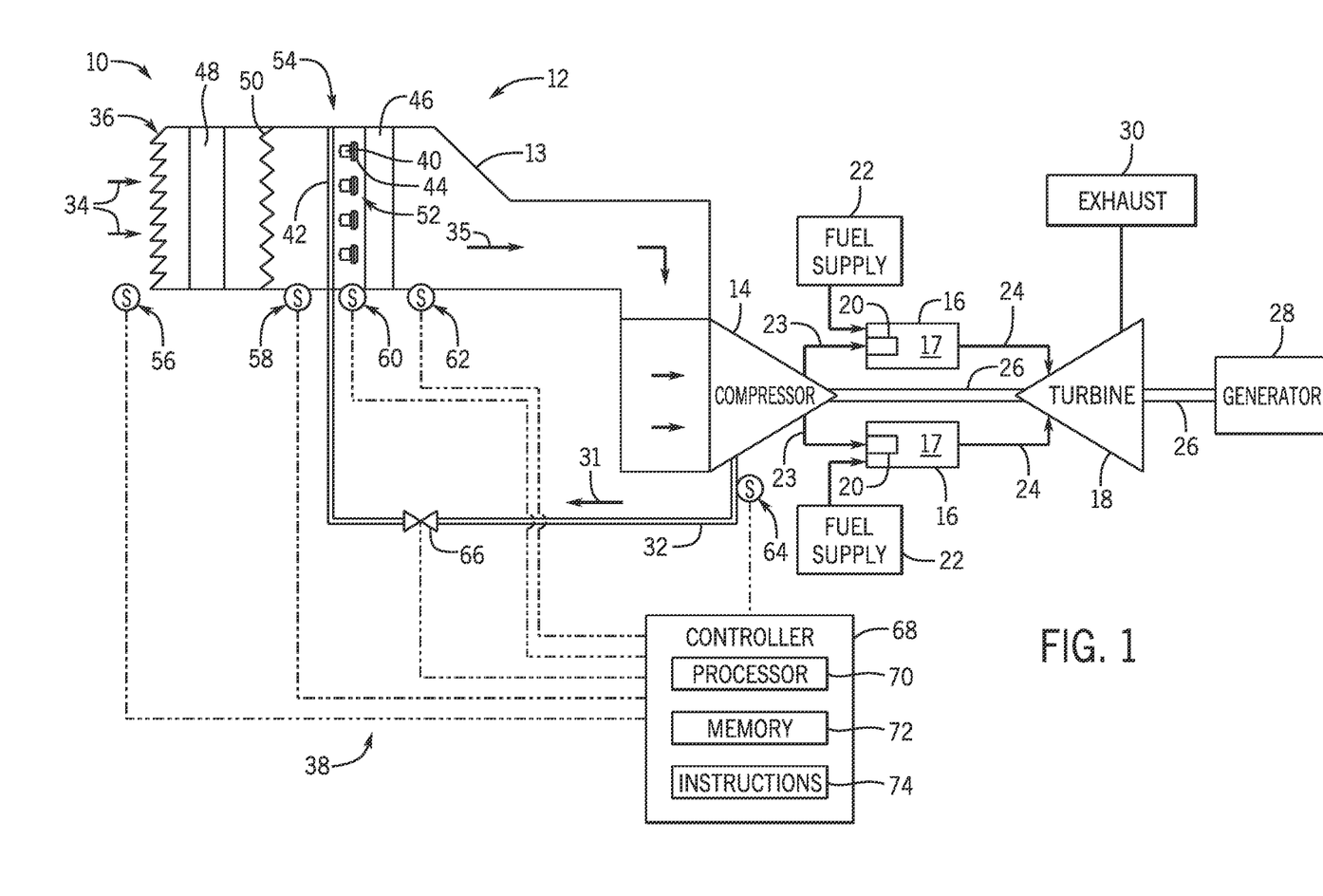
FIG. 1 is a block diagram of a gas turbine system having an air intake system, in accordance with an embodiment.

Turning now to the drawings, FIG. 1 is a block diagram of an embodiment of a gas turbine system 10 (e.g., gas turbine engine). The gas turbine system 10 includes an air intake system 12 having an air intake conduit 13 (e.g., housing). The gas turbine system 10 also includes a compressor 14, one or more combustors 16, and a turbine 18. The gas turbine system 10 intakes an airflow 34 (e.g., ambient air) into the air intake system 12, mixes the airflow 34 with a heated fluid within the air intake system 12 to form a heated airflow 35, compresses the heated airflow 35 through the compressor 14 to form a compressed airflow 23, and combusts a fuel with the compressed airflow 23 in the one or more combustors 16. Each combustor 16 has one or more fuel nozzles 20 configured to inject a liquid fuel and/or a gaseous fuel (e.g., natural gas or syngas) from one or more fuel supplies 22 into a combustion chamber 17. Although not shown, in some embodiments, the fuel nozzles 20 may include primary and secondary fuel nozzles that inject fuel at a primary fuel injection zone and a secondary fuel injection zone, respectively.

Each combustor 16 combusts the fuel injected by the fuel nozzles 20 with the compressed airflow 23 to create hot, pressurized combustion gases 24 (e.g., exhaust gas), which is then directed into the turbine 18. The turbine 18 has turbine blades coupled to a shaft 26, which is coupled to a load such as an electric generator 28. As the combustion gases 24 flow into and through the turbine 18, the combustion gases 24 drive rotation of the turbine blades and the shaft 26, thereby driving the electric generator 28. In some embodiments, the shaft 26 may be connected to another load, such as machinery, a propeller of an aircraft or ship, or a compressor. Eventually, the combustion gases 24 exit the gas turbine system 10 via an exhaust section 30 (e.g., an exhaust diffuser, an exhaust duct, an exhaust stack or tower, an emissions control system such as a selective catalytic reduction (SCR) system, etc.). In the illustrated embodiment, the shaft 26 is coupled to a compressor shaft of the compressor 14, which has compressor blades coupled to the compressor shaft in one or more stages (e.g., 1 to 30 stages in different axial positions). The rotation of the compressor blades within the compressor 14 causes compression of the airflow 34 from the air intake system 12.

Furthermore, the gas turbine system 10 also extracts or bleeds a portion of the compressed airflow (e.g., the heated fluid or a heated fluid flow, as indicated by arrow 31) from the compressor 14 through an extraction or bleed conduit 32 to an anti-icing system 38 (e.g., an inlet bleed heat [IBH] system). In particular, the anti-icing system 38 includes multiple nozzles 40 (e.g., anti-icing nozzles; inlet bleed heat [IBH] nozzles) and a manifold 42 (e.g., an inlet bleed heat [IBH] manifold). Each of the multiple nozzles 40 is provided with a cap 44 (e.g., end cap), which may be integrally formed with a body of the nozzle 40 or coupled to the body of the nozzle 40 (e.g., via a threaded interface or a welded joint).

In operation, the heated fluid from the bleed conduit 32 is provided into the manifold 42, which delivers the heated fluid to the multiple nozzles 40, which spray the heated fluid into the airflow 34 to form the heated airflow 35. At least some portion of the caps 44 are positioned downstream of outlets of the nozzles 40, and the caps 44 are configured to guide (e.g., turn) the heated fluid to flow into the airflow 34 to facilitate mixing the airflow 34 with the heated fluid upstream of a filter 46 of the air intake system 12. Thus, the nozzles 40 with the caps 44 operate to block a buildup of ice on the filter 46 and/or to generally maintain the heated airflow 35 at a temperature that is within desirable limits across a face of the filter 46 (e.g., across all or most of the face of the filter 46) to enable proper operation of the air intake system 12 and to provide satisfactory performance of the gas turbine system 10.

The bleed conduit 32 may be one or more bleed conduits that are coupled to the compressor 14 at or downstream from each, some, or one of the one or more compressor stages. The compressor 14 increases the pressure and temperature of the compressed airflow 23 with each subsequent compressor stage, and thus the bleed conduit 32 may extract the compressed airflow 23 at a particular compressor stage with a suitable pressure and temperature for use in the anti-icing system 38. In certain embodiments, the anti-icing system 38 may selectively extract the compressed airflow 23 (e.g., as the heated fluid, as indicated by arrow 31) through the bleed conduit 32 based on a temperature (e.g., monitored by one or more sensors, S) of the airflow 34 entering the air intake system 12, a temperature of the heated airflow 35 at the filter 46, and/or a temperature of the heated airflow 35 at the compressor 14. For example, with a progressively lower ambient temperature, the anti-icing system 38 may extract the compressed airflow through a greater number of bleed conduits 32 and/or through bleed conduits 32 at progressively later compressor stages of the compressor 14.

In operation, the air intake system 12 receives the airflow 34 through an air hood 36 coupled to the air intake conduit 13. In some embodiments, the airflow 34 may pass through or across one or more additional air intake components, such as multiple silencer baffles 48, one or more coalescers 50, the nozzles 40 with the caps 44, the manifold 42, and the filter 46. Together, each nozzle 40 with its cap 44 may be considered a nozzle assembly 52, and the nozzle assemblies 52 with the manifold 42 may be considered an anti-icing assembly 54 (e.g., inlet bleed heat [IBH] assembly).

As noted above, the anti-icing system 38 also includes multiple sensors S that are configured to monitor operational conditions, such as the temperature, humidity, or various conditions conducive to ice formation. For example, the anti-icing system 38 may include one or more sensors 56 positioned at or outside of the air hood 36 to thereby monitor ambient conditions of the air (e.g., ambient temperature, humidity, etc.) The anti-icing system 38 may include one or more sensors 58 positioned at or upstream of the manifold 42, such as between the manifold 42 and the air hood 36. The anti-icing system 38 also may include one or more sensors 60 positioned at or downstream from the manifold 42, such as at the filter 46 or between the manifold 42 and the filter 46. Furthermore, the anti-icing system 38 may include one or more sensors 62 positioned downstream of the filter 46, such as at or upstream of the intake of the compressor 14. The anti-icing system 38 also may include one or more sensors 64 disposed along each of the bleed conduits 32.

The anti-icing system 38 also includes a controller 68 communicatively coupled to the sensors 56, 58, 60, 62, and 64, a valve 66 disposed along each bleed conduit 32, and various components of the gas turbine system 10 (e.g., valves that control a supply of the fuel from the fuel supply 22 to the fuel nozzles 20). The controller 58 has a processor 70, a memory 72, and computer-readable instructions 74 stored on the memory 72 and executable by the processor 70. The controller 68 obtains sensor readings from the sensors S, and the controller 68 may use the computer-readable instructions 74 to regulate the operation of the anti-icing system 38 based on these sensor readings, upper and lower thresholds for temperature (e.g., desirable limits or targets), computer models, and/or user input. For example, if the temperature at one or more of the sensors falls below a lower temperature threshold (e.g., 0 degrees Celsius), then the controller 68 may send a control signal to an actuator (e.g., an electric actuator) of the valve 66 to partially or entirely open the valve 66 to enable a flow of the heated fluid through the bleed conduit 32 to the manifold 42. Although FIG. 1 illustrates the compressed airflow from the compressor 14 as the heated fluid supplied to the manifold 42, certain embodiments of the anti-icing system 38 may be additionally or alternatively coupled to one or more other sources of heated fluid (e.g., other sources of heated airflow, exhaust gas).

In this way, the controller 68 may monitor the anti-icing system 38 and control the flowrate and/or the temperature of the heated fluid into the manifold 42 and through the nozzles 40 into the air intake conduit 13, thereby adjusting the temperature in the air intake conduit 13 to inhibit and/or remove ice formation on the filter 46 or elsewhere in the air intake system 12 and/or in the compressor 14. As discussed in more detail below, the caps 44 guide the heated fluid ejected by the nozzles 40 to facilitate mixing between the airflow 34 and the heated fluid to thereby adjust the temperature of the heated airflow and/or to make the temperature of the heated airflow 35 more uniform within a region of the air intake conduit 13 downstream of the nozzle assemblies 52 (e.g., between the nozzle assemblies 52 and the filter 46, and particularly across a face of the filter 46).

Figure 2:
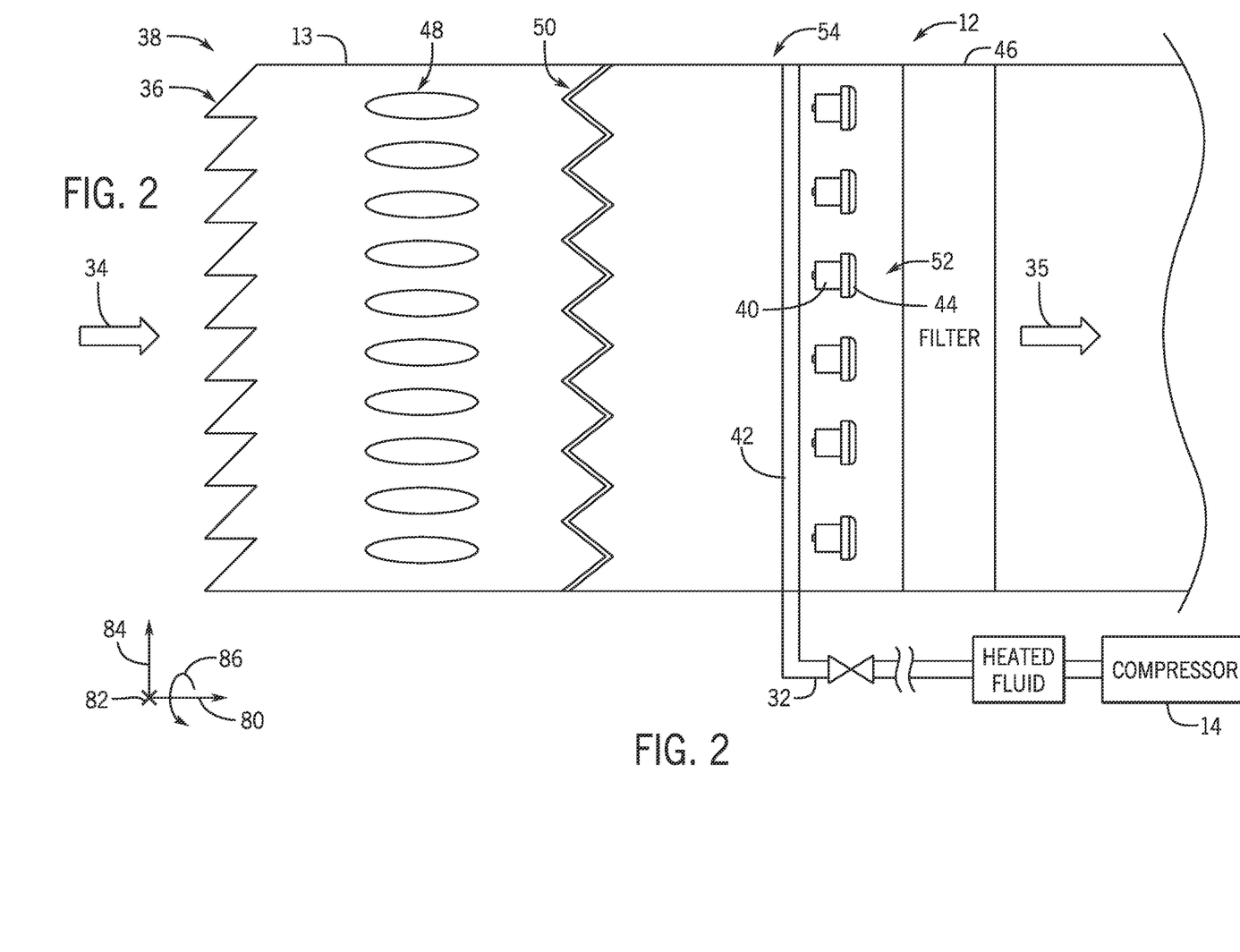
FIG. 2 is a schematic of a portion of an anti-icing system that may be used in the air intake system of FIG. 1, in accordance with an embodiment.

FIG. 2 is a schematic of an embodiment of the anti-icing system 38 coupled to the air intake system 12. To facilitate discussion, the anti-icing system 38 and the air intake system 12 may be described with reference to a longitudinal axis or direction 80, a lateral axis or direction 82, a vertical axis or direction 84, and/or a circumferential axis or direction 86. As used herein, a downstream direction is generally aligned with the longitudinal direction 80, while an upstream direction is generally opposite the longitudinal direction 80.

As shown, the anti-icing system 38 includes the anti-icing assembly 54 having the manifold 42 and the nozzle assemblies 52. Each nozzle assembly 52 includes the nozzle 40 and the cap 44 (only one nozzle assembly 52 is labeled for image clarity). The airflow 34 enters the air intake system 12 through the air hood 36, which may include multiple angled baffles to block entry of rain or snow. The airflow 34 may also pass through multiple silencer baffles 48 and/or coalescers 50 upstream of the nozzle assemblies 52. The silencer baffles 48 have one or more acoustic attenuation features (e.g., acoustic attenuation surface features, internal material) to help reduce acoustic noise caused by the airflow 34 passing through the air intake system 12. The coalescers 50 are configured to remove water from the airflow 34. The coalescers 50 may include mechanical coalescers, electrostatic coalescers, or a combination thereof.

After the airflow 34 mixes with the heated fluid to form the heated airflow 35, the heated airflow 35 may then pass through the filter 46. The filter 46 may include any number and type of filters. The filter 46 may be configured to filter particulate and moisture; however, the filter 46 may be susceptible to ice formation at certain low temperatures and/or heat damage at certain high temperatures. Although the above components are illustrated in a sequence (e.g., upstream to downstream) in the air intake conduit 13, various embodiments may rearrange each of the foregoing components in any suitable order, except that the nozzle assemblies 52 remain upstream from the filter 46.

The nozzles 40 are arranged along the lateral axis 82 and the vertical axis 84 (e.g., spaced apart in a grid-like pattern of multiple rows and multiple columns). In the illustrated embodiment, each nozzle assembly 52 is coupled to the manifold 42 on a downstream side of the manifold 42, such that the nozzle assembly 52 is positioned between the manifold 42 and the filter 46 along the longitudinal axis 80. However, it should be appreciated that each nozzle assembly 52 may be coupled to the manifold 42 on an upstream side of the manifold 42, such that the manifold 42 is positioned between the nozzle assembly 52 and the filter 46 along the longitudinal axis 80. In any case, regardless of the relative positioning of the nozzle assemblies 52 and the manifold 42, the nozzle assemblies 52 are positioned on an upstream side of the filter 46 along the longitudinal axis 80.

In the illustrated embodiment, the heated fluid includes the compressed airflow extracted from the compressor 14, as discussed above with reference to FIG. 1. The compressed air from the compressor 14 may be approximately 200 to 600 degrees Celsius, having approximate pressures of 800 to 900 Kilopascals. However, the anti-icing system 38 may directly or indirectly use any one or more heated fluids to elevate the temperature of the airflow 34. For example, as illustrated, the heated fluid may be any suitable heated fluid that can be directly injected into the airflow 34 through the nozzles 40 to elevate the temperature of the airflow 34, including, but not limited to, a heated air or exhaust gas.

Figure 3:
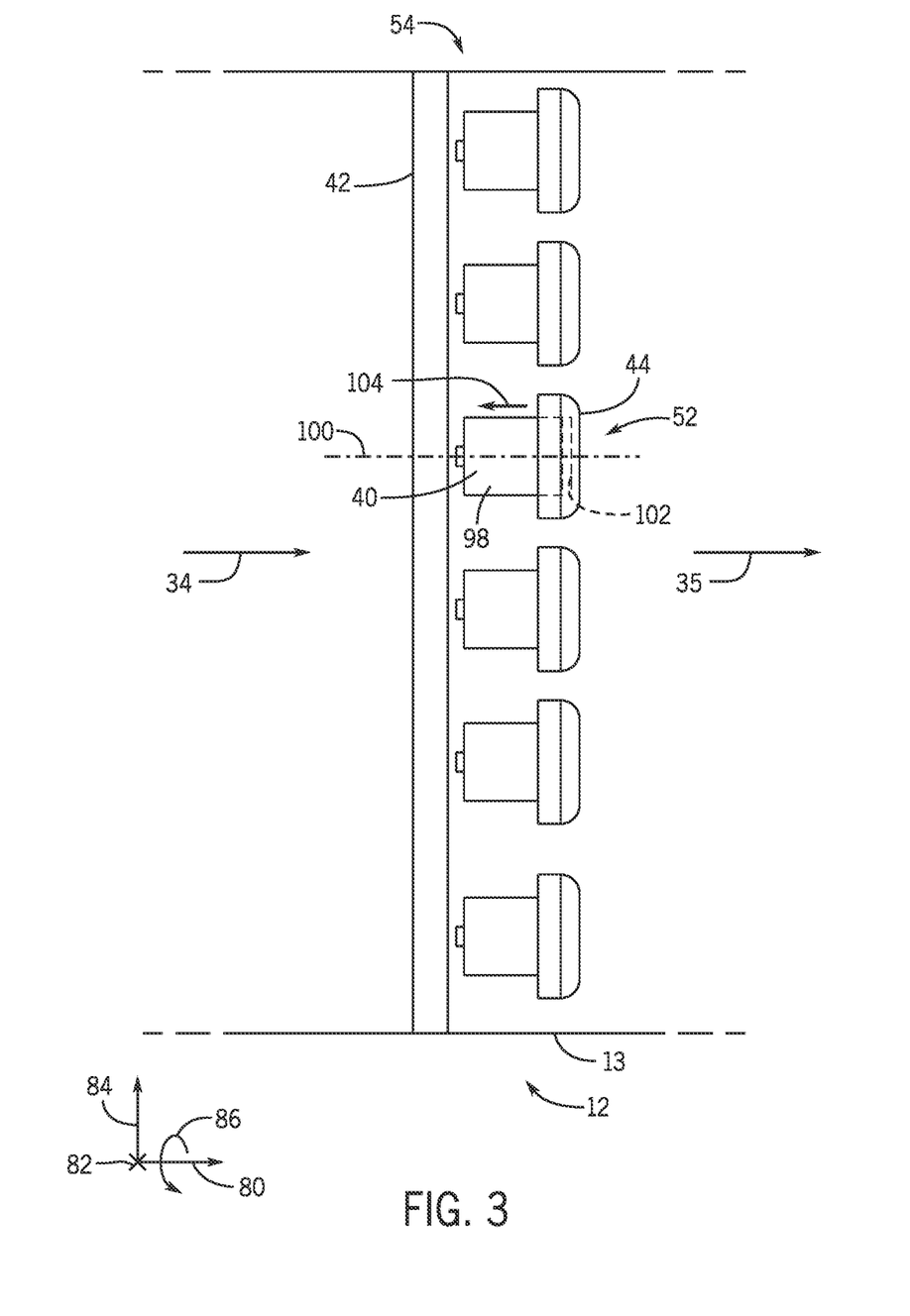
FIG. 3 is a side view of an anti-icing assembly of the anti-icing system of FIG. 2, in accordance with an embodiment.

FIG. 3 is a side view of an embodiment of the anti-icing assembly 54 having the manifold 42 and the nozzle assemblies 52. Each nozzle assembly 52 includes the nozzle 40 and the cap 44 (only one nozzle assembly 52 is labeled for image clarity). Additionally, each nozzle 40 includes a body 98 (e.g., nozzle body; housing having a side wall). Each nozzle 40 may have a central axis 100 (e.g., parallel to the longitudinal axis 80) and may have one or more outlets 102 formed in the body 98 (e.g., extending through the side wall). The outlets 102 may have any suitable form. For example, the outlets 102 may include one or more continuous rings that extend circumferentially about the nozzle 40 (as shown), or the outlets 102 may be discrete openings spaced circumferentially about the nozzle 40. The outlets 102 may also be positioned at any suitable location between a first, upstream end of the nozzle 40 and a second, downstream end of the nozzle 40 (e.g., any suitable location along the longitudinal axis 80). Regardless of their form and/or position, the outlets 102 may inject (e.g., spray) the heated fluid radially outwardly from the nozzle 40 and/or crosswise to the airflow 34. The cap 44 may be positioned proximate to the second, downstream end of the nozzle 40, and at least a portion of the cap 44 is positioned downstream from the outlets 102. As discussed in more detail below, the cap 44 may direct the heated fluid that is ejected through the outlets 102 of the nozzle 40 into the airflow 34, as shown by arrow 104.

Figure 4:
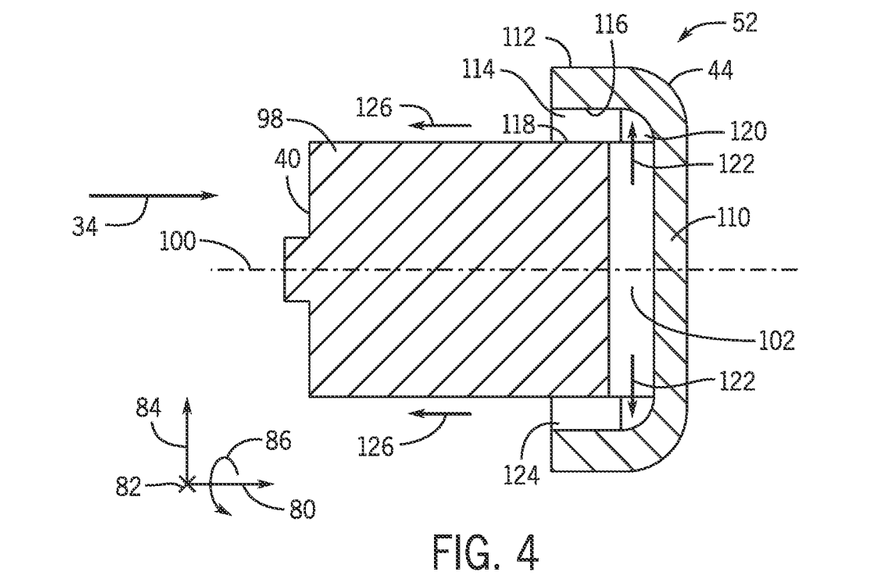
FIG. 4 is a cutaway side view of a nozzle assembly of the anti-icing assembly of FIG. 3, in accordance with an embodiment.

FIG. 4 is a cutaway side view of the nozzle assembly 52, in accordance with an embodiment. In particular, a portion of the cap 44 is removed to show a portion of the nozzle 40 under the cap 44. Each nozzle 40 includes the body 98, the central axis 100, and the one or more outlets 102 formed in the body 98 (e.g., extending through the side wall).

As shown, the cap 44 has a generally c-shape cross-sectional shape formed by an end portion 110 (e.g., plate) and an annular wall portion 112. The end portion 110 and/or the annular wall portion 112 may be coupled to the body 98 of the nozzle 40 via any suitable coupler, such as a threaded interface, a welded joint, or the like. As noted above, the cap 44 may instead be integrally formed with the body 98 of the nozzle 40, such as via 3D printing techniques. Furthermore, the cap 44 may have any suitable cross-sectional shape and/or may be devoid of the end portion 110. For example, the cap 44 may include only the annular wall portion 112 (e.g., may be a ring) that couples to the nozzle 40 to guide the heated fluid and to provide the operational features disclosed herein.

The annular wall portion 112 extends circumferentially about at least a portion of the body 98 of the nozzle 40 (e.g., is positioned radially outwardly of at least the portion of the body 98 of the nozzle 40). For example, the annular wall portion 112 extends circumferentially about the one or more outlets 102 formed in the body 98 of the nozzle 40. The cap 44 defines a channel 114 (e.g., annular channel) that is fluidly coupled to the one or more outlets 102. In particular, the channel 114 is defined between a radially inner surface 116 of the annular wall portion 112 of the cap 44 and a radially outer surface 118 of the body 98 of the nozzle 40, and the channel 114 extends circumferentially about the body 98 of the nozzle 40. In some embodiments, part of the channel 114 may be defined by a curved inner surface 120, which may be considered part of the radially inner surface 116 of the annular wall portion 112.

In operation, the airflow 34 may generally flow in a first direction (e.g., the downstream direction) from the first, upstream end of the nozzle 40 toward the second, downstream end of the nozzle 40. The heated fluid may be ejected in a second direction (e.g., radially outward direction; crosswise to the first direction) from the one or more outlets 102 of the nozzle 40 and into the channel 114, as represented by arrow 122. The heated fluid may be blocked from flowing in the second direction and/or the first direction while the heated fluid is within the cap 44. Instead, the heated fluid may be directed (e.g., turned) by the channel 114 (e.g., via contact with the radially inner surface 116 of the annular wall portion 112) to flow through the channel 114 and out of an opening 124 (e.g., annular opening) of the channel 114. In this way, the heated fluid may be output in a third direction (e.g., the upstream direction) from the second, downstream end of the nozzle 40 toward the first, upstream end of the nozzle 40, as represented by arrow 126. Thus, the heated fluid may be output in the third direction that is opposite (e.g., generally or substantially opposite) of the first direction of the airflow 34. By injecting the heated fluid into the airflow 34, the nozzle assembly 52 may facilitate mixing of the airflow 34 and the heated fluid upstream of the filter 46. Thus, the nozzle assembly 52 with the nozzle 40 and the cap 44 may improve the anti-icing capability of the anti-icing system 38, block formation of cold spots that could otherwise experience ice formation, block formation of hot spots that could otherwise damage the filter 46, enable use of a smaller number of nozzles 40 with a greater spacing between adjacent nozzles 40, and/or enable use of a smaller size air intake conduit 13, for example.

Also, advantageously, the cap 44 turns the heated fluid to inject the heated fluid in the upstream direction (e.g., into the airflow 34 and away from the filter 46). Thus, the initial mixing occurs upstream of the one or more outlets 102, which provides more space (e.g., distance along the longitudinal axis 80; as compared to the heated fluid being injected into the airflow 34 at the one or more outlets 102 without the cap 44) for mixing of the airflow 34 and the heated fluid upstream of the filter 46. Thus, the nozzle assembly 52 may provide an efficient anti-icing process within a given size of the air intake conduit 13 (e.g., that has limited space within the air intake conduit 13; retrofitted) and/or may enable use of a smaller size air intake conduit 13 (e.g., as compared to air intake conduits that are devoid of the nozzle assemblies 52 with the nozzles 40 and the caps 44). It should be appreciated that various alternatives are envisioned. For example, the radially inner surface 116 of the annular wall portion 112 may be angled with respect to the longitudinal axis 80 (e.g., an upstream end of the radially inner surface 116 is positioned radially outwardly from a downstream end of the radially inner surface 116) to provide a different spread for the heated fluid (e.g., to spray further radially outwardly about the nozzle 40).

Figure 5:
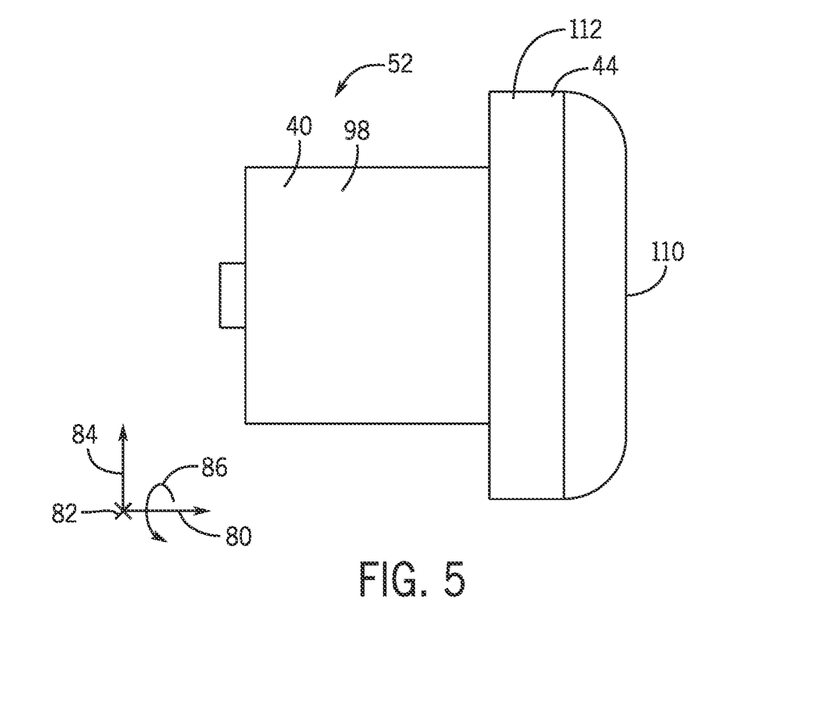
FIG. 5 is a side view of the nozzle assembly of FIG. 4, in accordance with an embodiment.
Figure 6:
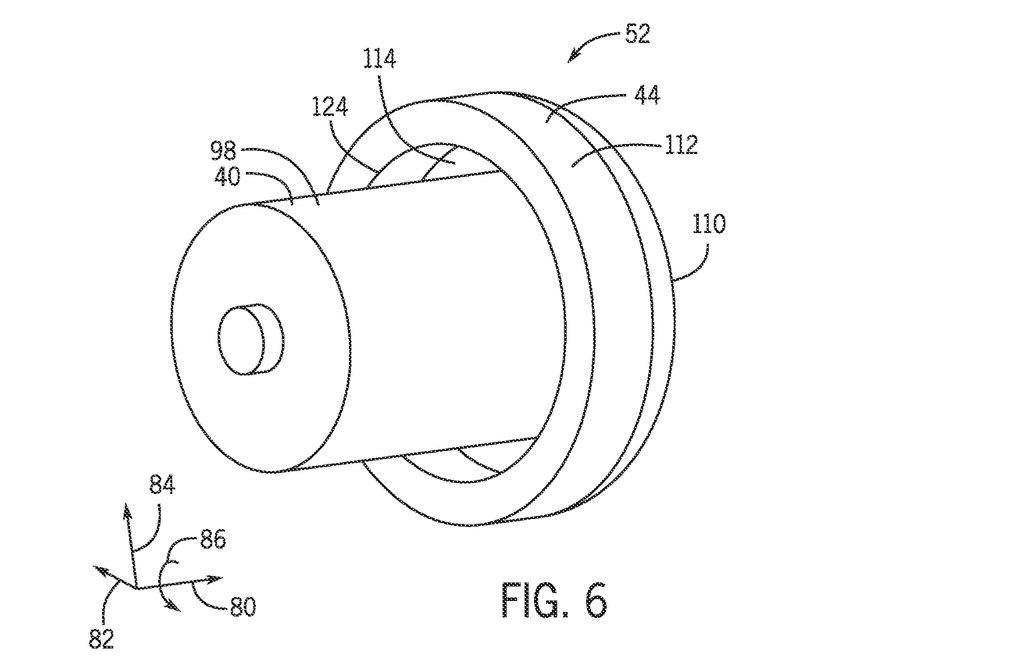
FIG. 6 is a rear perspective view of the nozzle assembly of FIG. 4, in accordance with an embodiment.
Figure 7:
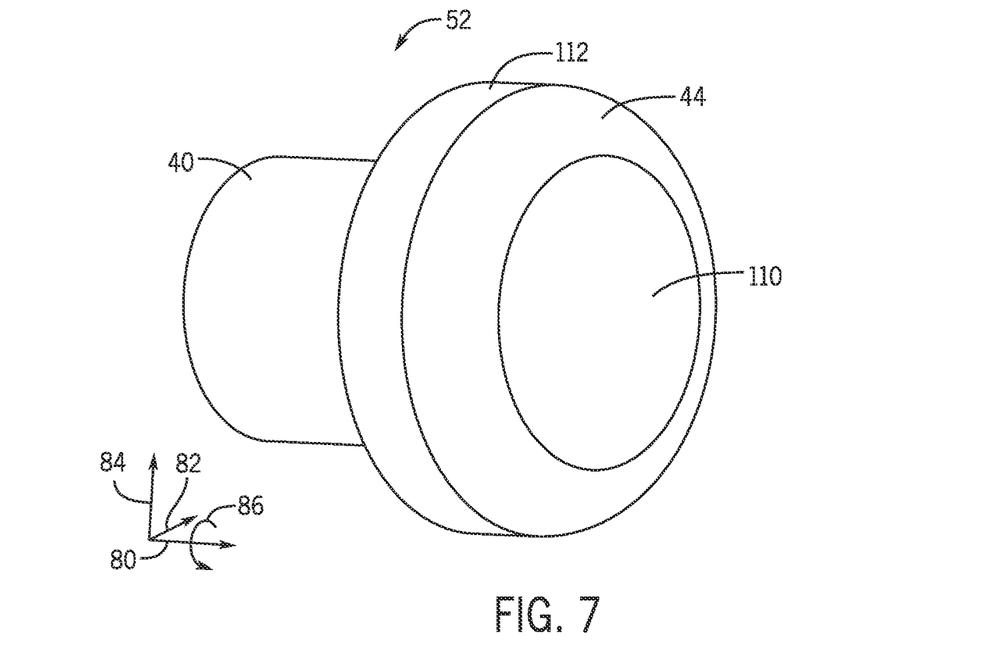
FIG. 7 is a front perspective view of the nozzle assembly of FIG. 4, in accordance with an embodiment.

FIGS. 5-7 provide different views of an embodiment of the nozzle assembly 52 having the nozzle 40 and the cap 44. In particular, FIG. 5 is a side view of the nozzle assembly 52, FIG. 6 is a rear perspective view (e.g., downstream perspective view) of the nozzle assembly 52, and FIG. 7 is a front perspective view (e.g., upstream perspective view of the nozzle assembly 52). As shown, the nozzle 40 includes the body 98, and the cap 44 includes the end portion 110 and the annular wall portion 112. As best shown in FIG. 6, the cap 44 defines the channel 114 to direct the heated fluid through the opening 124.

Figure 8:
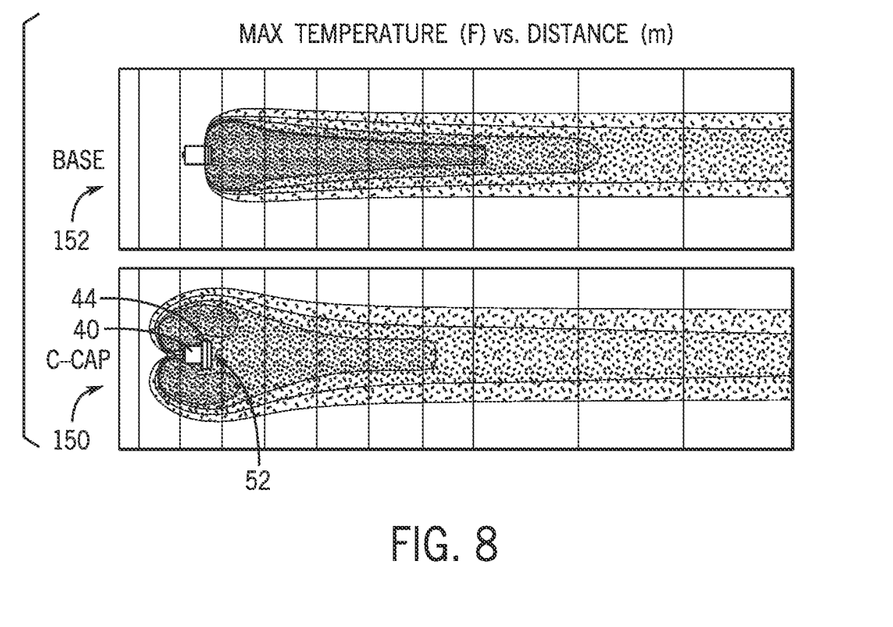
FIG. 8 is a series of heat maps, including a heat map that illustrates temperature over distance for the nozzle assembly of FIG. 4, in accordance with an embodiment.

FIG. 8 includes heat maps that illustrate operational advantages of the nozzle assembly 52 disclosed herein. In particular, a first heat map 150 illustrates a temperature of the heated airflow over distance for the nozzle assembly 52 with the nozzle 40 and the cap 44, and a second heat map 152 illustrates a temperature of a heated airflow over distance for another nozzle (e.g., the same as or similar to the nozzle 40) that does not include the cap 44. In the "base" design in which the nozzles 40 do not include caps 44, the second heat map 152 illustrates that the heated fluid is sprayed in the downstream direction into the airflow, resulting in high temperature areas downstream from each nozzle. In contrast, in the "c-cap" design of nozzles 40 with caps 44, the caps 44 turn the flow in an upstream direction for mixing with the airflow. Thus, the heated fluid and the airflow begin to mix in a region that is upstream of the nozzle assembly 52, and the mixing between the heated fluid and the airflow effectively reduces the temperature and/or provides for a more uniform temperature downstream of the nozzle assembly 52.

Figure 9:
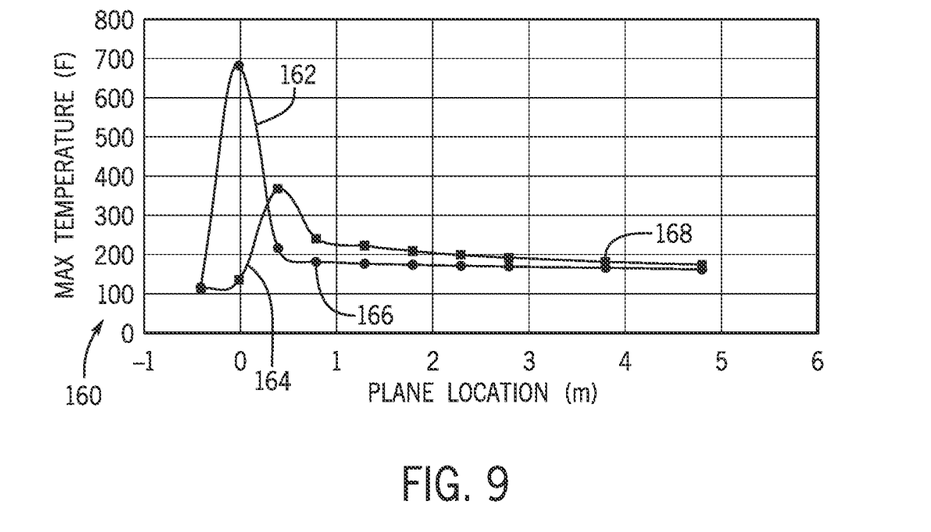
FIG. 9 is a graph that illustrates temperature over distance for the nozzle assembly of FIG. 4, in accordance with an embodiment.

FIG. 9 is a graph 160 with a first line 162 that corresponds to the first heat map 150 of FIG. 8 and that represents the temperature over the distance for the nozzle assembly 52 that includes the nozzle 40 and the cap 44. The graph 160 also illustrates a second line 164 that corresponds to the second heat map 152 of FIG. 8 and that represents the temperature over the distance for another nozzle that does not include the cap 44. As shown, for the heated fluid (e.g., with a temperature of about 425 degrees Celsius), the nozzle assembly 52 with the nozzle 40 and the cap 44 may mix the airflow and the heated fluid such that a maximum temperature of the heated airflow reaches about 82 degrees Celsius over a distance of 0.8 meters (e.g., point 166). However, the other nozzle that does not include the cap 44 may mix the airflow and the heated fluid such that a maximum temperature of the heated airflow reaches about 82 degrees Celsius over a distance of 3.8 meters (e.g., point 168). Thus, the nozzle assembly 52 with the nozzle 40 and the cap 44 may advantageously adjust the temperature of the heated airflow in a desirable manner (e.g., to be at a desirable temperature and/or to be more uniform) at a location that is further upstream from the filter 46 along the longitudinal axis 80 (see FIGS. 1 and 2) to thereby reduce damage (e.g., due to ice buildup and/or hot spots) to the filter 46, for example. Accordingly, by using the nozzles 40 with caps 44, the anti-icing system 38 may be retrofit more easily into space constraints of existing air intake systems and, in the case of new construction, may employ a shorter air intake system 12 than those using capless nozzles, thereby saving capital expense.

Figure 10:
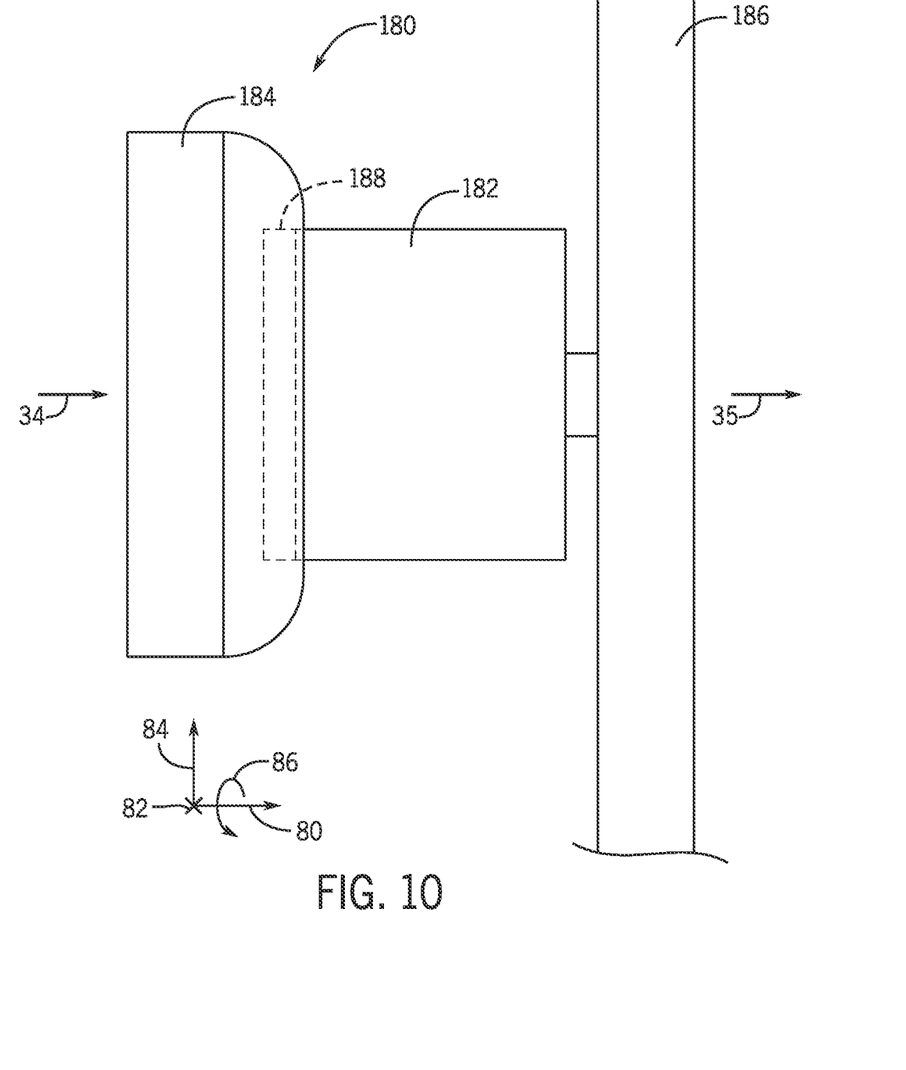
FIG. 10 is a side view of a nozzle assembly that may be used in an anti-icing assembly of FIG. 3, wherein the nozzle assembly is configured to be positioned upstream of a manifold, in accordance with an embodiment.

FIG. 10 is a side view of an embodiment of a nozzle assembly 180 that may be used in an anti-icing system for a gas turbine system, such as in the anti-icing system 38 of the gas turbine system 10 of FIG. 1. As shown, the nozzle assembly 180 includes a nozzle 182 and a cap 184. The nozzle assembly 180 is positioned upstream of a manifold 186 that distributes the heated fluid to the nozzle assembly 180.

The cap 184 may be positioned proximate to a first, upstream end of the nozzle 182, and at least a portion of the cap 184 is positioned downstream of one or more outlets 188 of the nozzle 182. Thus, the heated fluid that is ejected from the one or more outlets 188 of the nozzle 182 is directed by the cap 184 to flow in the upstream direction into the airflow 34. The cap 184 may have any of the features (e.g., the c-shaped cross-sectional shape, the channel) of the cap 44 discussed above with respect to FIGS. 1-9 to enable the cap 184 to guide the heated fluid in this way to facilitate mixing between the heated fluid and the airflow 34 to form the heated airflow 35.

Positioning the nozzle assemblies 180 upstream of the manifold 186 and/or positioning the outlets 188 and the caps 184 proximate to the first, upstream end of the nozzles 182 may provide more space (e.g., distance along the longitudinal axis 80; as compared to the nozzle assemblies 180 being positioned downstream of the manifold 186 and/or the outlets 188 and the caps 184 being positioned proximate to the second, downstream end) for mixing of the airflow 34 and the heated fluid upstream of the filter 46 of the air intake system 12.

Figure 11:
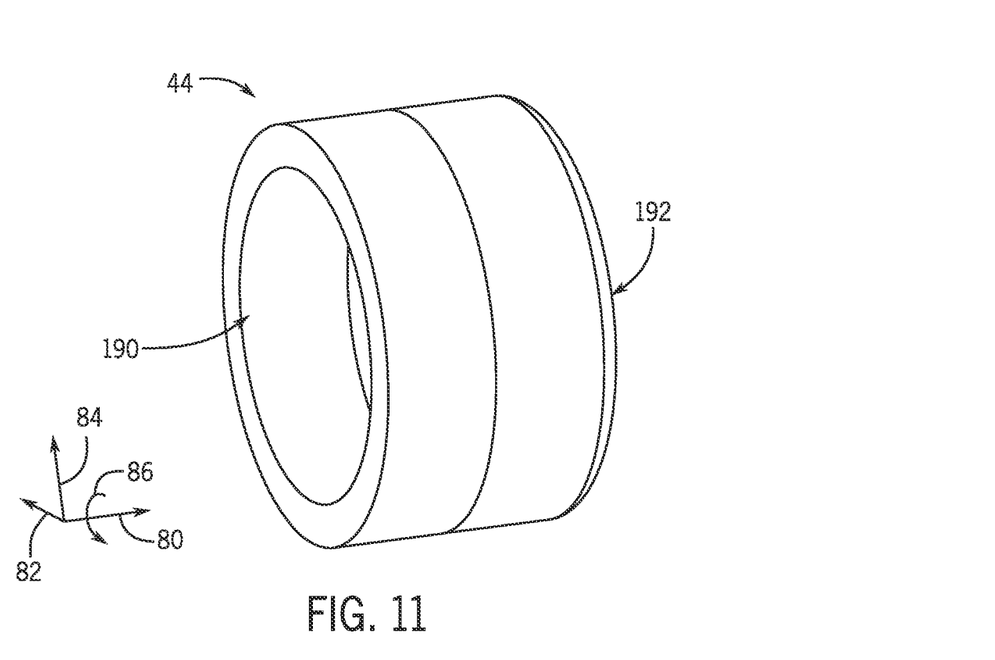
FIG. 11 is a perspective view of a cap that may be used as part of a nozzle assembly of the anti-icing assembly of FIG. 3, wherein the cap includes an extended length, in accordance with an embodiment.

FIGS. 11-16 illustrate various features, such as surface features, of the cap 44 that may be used as part of the nozzle assembly 52. It should also be appreciated that the various features may be utilized in the cap 184 as part of the nozzle assembly 180. With this in mind, FIG. 11 is a perspective view of an embodiment of the cap 44, wherein the cap 44 includes an extended length along the longitudinal axis 80 (e.g., as compared to the cap 44 illustrated in FIGS. 1-9; or as compared to the cap 184 illustrated in FIG. 10). While an extra segment 190 and an end segment 192 are delineated in FIG. 11 to facilitate discussion and to better illustrate the extended length, it should be appreciated that the cap 44 may be formed as a unitary, one-piece structure as shown in FIGS. 1-9 with any suitable length along the longitudinal axis 80. However, the extra segment 190 and the end segment 192 may be separate pieces that are configured to be coupled to one another (e.g., via threads and/or welds) to thereby make a total length of the cap 44 adjustable (e.g., by coupling the extra segment 190, which may be available in varying lengths, to the end segment 192). Regardless, it should be appreciated that the extended length may be any suitable length relative to the body 98 of the nozzle 40. For example, the extended length may be selected to cover or to extend over more than 10, 20, 30, 40, 50, 60 percent or more of a respective length of the body 98 of the nozzle 40. The extended length may be selected to provide appropriate or desired flow of the heated fluid within the cap 44.

Figure 12:
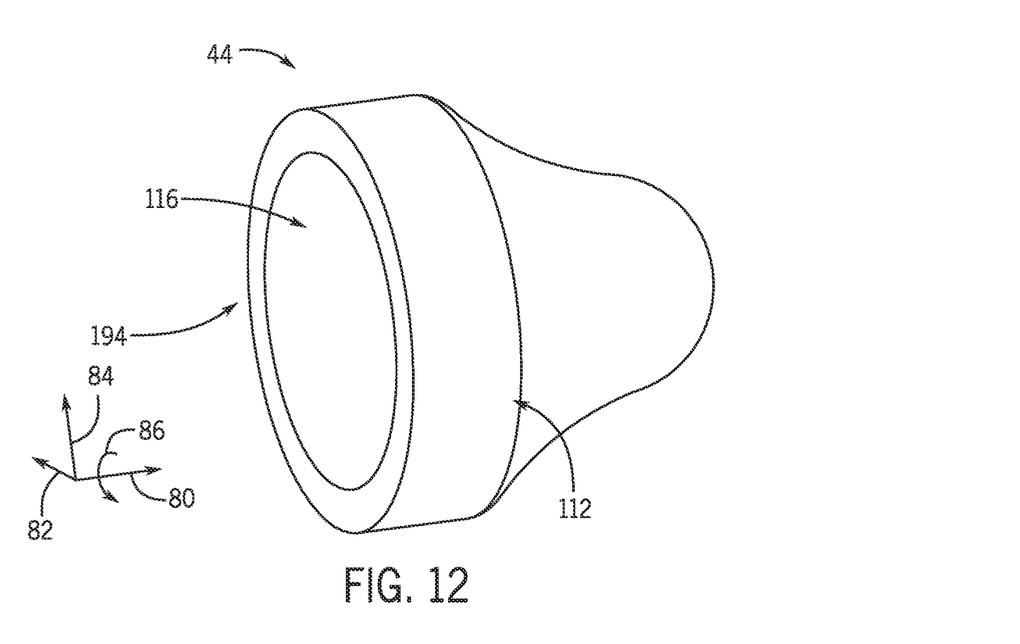
FIG. 12 is a perspective view of a cap that may be used as part of a nozzle assembly of the anti-icing assembly of FIG. 3, wherein the cap defines a radially-expanded portion, in accordance with an embodiment.

FIG. 12 is a perspective view of an embodiment of the cap 44 having a radially expanded portion 194, in accordance with an embodiment. The radially expanded portion 194 is defined by a radially expanding, radially inner surface 116 of the annular wall portion 112. In particular, a radius of the radially inner surface 116 increases in an upstream direction (e.g., the radius is lower at a downstream end and is higher at an upstream end, by the opening 124). As discussed above, the cap 44 may be positioned about the body 98 of the nozzle 40 to facilitate flow of the heated fluid through the channel 114 defined between the radially inner surface 116 and the body 98 of the nozzle 40.

Figure 13:
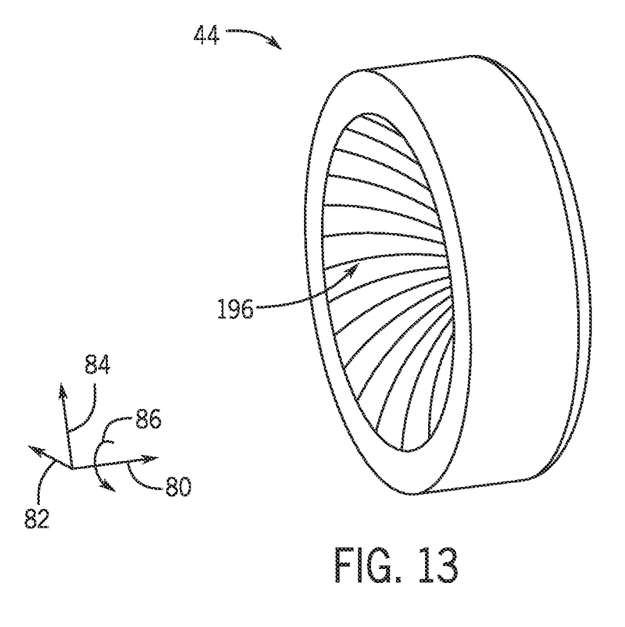
FIG. 13 is a perspective view of a cap that may be used as part of a nozzle assembly of the anti-icing assembly of FIG. 3, wherein the cap includes a curved pattern formed in a radially inner surface of an annular wall portion of the cap, in accordance with an embodiment.
Figure 14:
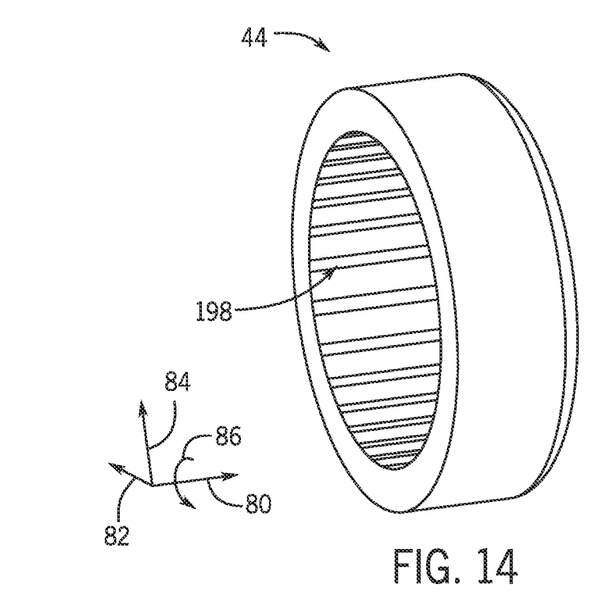
FIG. 14 is a perspective view of a cap that may be used as part of a nozzle assembly of the anti-icing assembly of FIG. 3, wherein the cap includes a linear pattern formed in a radially inner surface of an annular wall portion of the cap, in accordance with an embodiment.

FIG. 13 is a perspective view of an embodiment of the cap 44 having a curved pattern formed 196 in the radially inner surface 116 of the annular wall portion 112 of the cap 44. FIG. 14 is a perspective view of an embodiment of the cap 44 having a linear pattern 198 formed in the radially inner surface 116 of the annular wall portion 112 of the cap 44. The curved pattern 196 and the linear pattern 198 may include surface texture, such as alternating grooves and protrusions spaced circumferentially about the radially inner surface 116 of the annular wall portion 112 of the cap 44. The curved pattern 196 may be configured to induce swirl of the heated fluid as the heated fluid travels through the channel 114 defined between the radially inner surface 116 and the body 98 of the nozzle 40. The curved pattern 196 and the linear pattern 198 may have a generally low profile and remove a smoothness of the radially inner surface 116.

Figure 15:
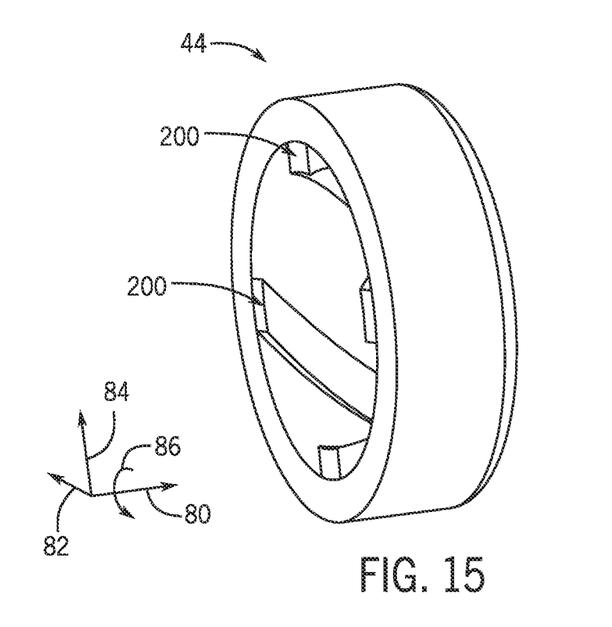
FIG. 15 is a perspective view of a cap that may be used as part of a nozzle assembly of the anti-icing assembly of FIG. 3, wherein the cap defines curved protrusions along a radially inner surface of an annular wall portion of the cap, in accordance with an embodiment.
Figure 16:
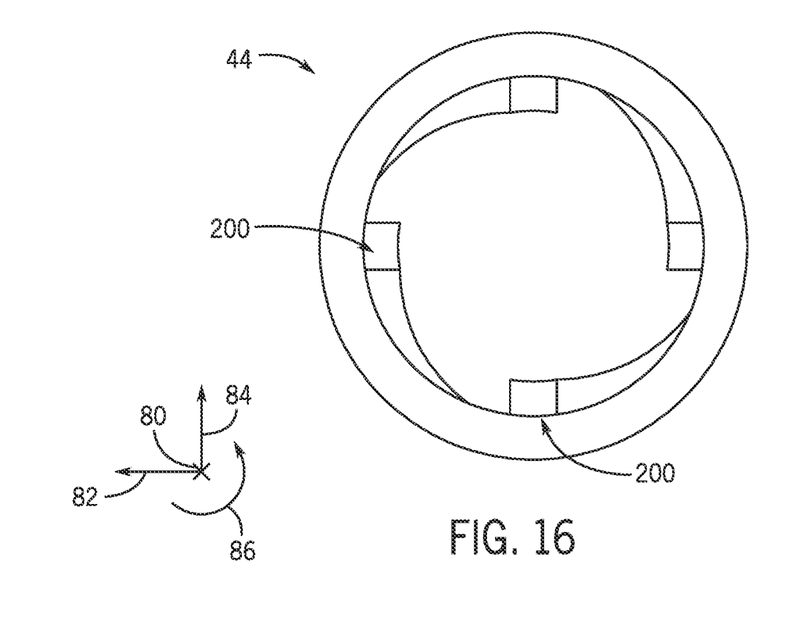
FIG. 16 is a rear view of the cap of FIG. 15, in accordance with an embodiment.

FIG. 15 is a perspective view, and FIG. 16 is a rear view, of an embodiment of the cap 44 having curved protrusions 200 that extend along the radially inner surface 116 of the annular wall portion 112 of the cap 44. As shown, the curved protrusions 200 are spaced circumferentially about the radially inner surface 116 of the annular wall portion 112 of the cap 44. The curved protrusions 200 may be configured to induce swirl of the heated fluid as the heated fluid travels through the channel 114 defined between the radially inner surface 116 and the body 98 of the nozzle 40. The curved protrusions 200 have a generally high profile (e.g., as compared to the curved pattern 196 and the linear pattern 198) and remove a smoothness of the radially inner surface 116. For example, each of the curved protrusions 200 may extend radially across more than 10, 20, 30, 40, 50, 60 percent or more of the channel 114.

While FIGS. 11-16 illustrate various features, including surface features (e.g., the curved pattern 196, the linear pattern 198, the curved protrusions 200), it should be appreciated that other features, including other surface features, may be provided as part of the cap 44. For example, the cap 44 may include linear protrusions that have a generally high profile and that extend linearly along the radially inner surface 116. Furthermore, the features, including the surface features, may be provided as part of the body 98 of the nozzle 40, such as along the radially outer surface 118 of the body 98 of the nozzle 40. For example, the body 98 of the nozzle 40 may include the same features as the cap 44 (e.g., both may have curved protrusions that extend into the channel 114). Furthermore, the features, including the surface features, may be combined in any suitable manner (e.g., the curved pattern 196 or the linear pattern 198 may be used in combination with the radially-expanded portion 194).

The technical effects of the anti-icing techniques disclosed herein include providing more effective mixing of the airflow and the heated fluid within the air intake system. Under certain conditions (e.g., cold ambient conditions), the mixing may result in more effective removal, reduction, and/or blocking of ice buildup and/or more effective reduction and/or blocking of hot spots on the filter of the air intake system of the gas turbine system as compared to traditional systems. The caps of the nozzle assemblies of the anti-icing assembly may include various features (e.g., shape, positioning) to facilitate mixing of the airflow with the heated fluid to provide the more effective removal, reduction, and/or blocking of ice buildup and/or more effective reduction and/or blocking of hot spots on the filter of the air intake system of the gas turbine system. Under certain conditions (e.g., hot ambient conditions and/or IBH maximum flow), the mixing may result in more effective reduction and/or blocking of hot spots on the filter of the air intake system of the gas turbine system as compared to traditional systems. The anti-icing assembly may be cost-effective in that the components may be configured to fit within and/or interface with existing anti-icing systems and/or existing air intake systems (e.g., retrofit).

This written description uses examples to disclose the embodiments of the present disclosure, including the best mode, and also to enable any person skilled in the art to practice the embodiments of the present disclosure, including making and using any devices or systems and performing any incorporated methods. The patentable scope of the present disclosure is defined by the claims and may include other examples that occur to those skilled in the art. Such other examples are intended to be within the scope of the claims if they have structural elements that do not differ from the literal language of the claims, or if they include equivalent structural elements with insubstantial differences from the literal language of the claims.

The invention claimed is:

1. An anti-icing system for a gas turbine system, the anti-icing system comprising:
   a plurality of nozzle assemblies, wherein each nozzle assembly of the plurality of nozzle assemblies comprises:
   a nozzle comprising one or more outlets that are configured to inject a heated fluid in a radially outward direction; and
   a cap comprising an annular wall that circumferentially surrounds at least a portion of the nozzle, wherein the cap defines an opening that faces an upstream direction and is configured to direct the heated fluid to exit through the opening in the upstream direction into an airflow to facilitate mixing of the heated fluid with the airflow.

2. The anti-icing system of claim 1, wherein the plurality of nozzle assemblies is arranged as a two-dimensional grid.

3. The anti-icing system of claim 1, comprising a manifold configured to distribute the heated fluid to the plurality of nozzle assemblies.

4. The anti-icing system of claim 3, wherein the plurality of nozzle assemblies is positioned upstream of the manifold.

5. The anti-icing system of claim 1, wherein the cap comprises a c-shape cross-sectional shape.

6. The anti-icing system of claim 1, wherein a radially outer surface of a body of the nozzle and a radially inner surface of the annular wall of the cap define an annular channel that is fluidly coupled to the one or more outlets.

7. The anti-icing system of claim 1, wherein a radially inner surface of the annular wall of the cap comprises one or more surface features.

8. The anti-icing system of claim 7, wherein the one or more surface features comprise protrusions spaced circumferentially about a radially inner surface of the annular wall of the cap, and the protrusions comprise a linear pattern or shape, a curved pattern or shape, or any combination thereof.

9. The anti-icing system of claim 1, wherein the cap comprises an end portion that blocks the heated fluid from flowing in a downstream direction.

10. The anti-icing system of claim 1, wherein the annular wall circumferentially surrounds the one or more outlets.

11. The anti-icing system of claim 1, wherein the nozzle and the cap are coupled to one another.

12. The anti-icing system of claim 1, comprising a filter positioned downstream of the plurality of nozzle assemblies.

13. The anti-icing system of claim 1, wherein the annular wall of the cap is formed from a plurality of segments coupled to one another to facilitate adjustment of a length of the annular wall of the cap.

14. The anti-icing system of claim 1, wherein the annular wall of the cap comprises a radially inner surface, and a radius of the radially inner surface increases in the upstream direction.

15. A gas turbine system, comprising:
a turbine;
a combustor; and
a compressor coupled to an air intake system, wherein the air intake system is configured to supply a heated airflow to the compressor, the air intake system comprises a filter system and an anti-icing system, and the anti-icing system comprises:
 a plurality of nozzle assemblies, wherein each nozzle assembly of the plurality of nozzle assemblies comprises:
  a nozzle with one or more outlets; and
  a cap comprising an annular wall that circumferentially surrounds the one or more outlets;
 wherein the nozzle is configured to inject a heated fluid through the one or more outlets, the cap defines an opening that faces an upstream direction, and the annular wall of the cap is configured to direct the heated fluid to exit through the opening in the upstream direction into an airflow to facilitate mixing of the heated fluid with the airflow to form the heated airflow upstream of the filter system.

16. The gas turbine system of claim 15, wherein the anti-icing system comprises a manifold configured to distribute the heated fluid to the plurality of nozzle assemblies.

17. The gas turbine system of claim 16, wherein the plurality of nozzle assemblies is positioned upstream of the manifold.

18. The gas turbine system of claim 15, wherein the nozzle and the cap are coupled to one another.

19. The gas turbine system of claim 15, wherein a radially outer surface of a body of the nozzle and a radially inner surface of the annular wall of the cap define an annular channel that is fluidly coupled to the one or more outlets.

20. The gas turbine system of claim 15, wherein the cap comprises an end portion that blocks the heated fluid from flowing in a downstream direction.

21. The gas turbine system of claim 15, wherein the air intake system is configured to direct the airflow in a downstream direction that is opposite the upstream direction.

22. The gas turbine system of claim 15, wherein the heated fluid comprises compressor discharge air from the compressor of the gas turbine system.

23. A method, comprising:
receiving an airflow that flows in a first direction into an air intake conduit of an air intake system of a gas turbine system;
injecting a heated fluid through one or more outlets of a nozzle positioned within the air intake conduit;
guiding the heated fluid through an annular channel defined between the nozzle and a cap that is positioned to circumferentially surround at least a portion of the nozzle; and
outputting, through an opening defined by the cap, the heated fluid in a second direction that is opposite the first direction into the airflow within the air intake conduit to facilitate mixing between the heated fluid and the airflow to form a heated airflow within the air intake conduit.

* * * * *